United States Patent
Kumar et al.

(10) Patent No.: US 10,062,922 B2
(45) Date of Patent: Aug. 28, 2018

(54) LITHIUM BATTERIES HAVING ARTIFICIAL SOLID ELECTROLYTE INTERPHASE MEMBRANE FOR ANODE PROTECTION

(71) Applicant: University of Dayton, Dayton, OH (US)

(72) Inventors: Jitendra Kumar, Beavercreek, OH (US); Guru Subramanyam, Dayton, OH (US); Fahima Ouchen, Beavercreek, OH (US); James G. Grote, Yellow Springs, OH (US)

( * ) Notice: Subject to any disclaimer, the term of this patent is extended or adjusted under 35 U.S.C. 154(b) by 171 days.

(21) Appl. No.: 15/006,636

(22) Filed: Jan. 26, 2016

(65) Prior Publication Data

US 2016/0218341 A1 Jul. 28, 2016

Related U.S. Application Data

(60) Provisional application No. 62/107,566, filed on Jan. 26, 2015.

(51) Int. Cl.
| | |
|---|---|
| *H01M 2/16* | (2006.01) |
| *H01M 4/134* | (2010.01) |
| *H01M 10/052* | (2010.01) |
| *H01M 10/0565* | (2010.01) |
| *H01M 10/0569* | (2010.01) |
| *H01M 4/38* | (2006.01) |
| *H01M 4/66* | (2006.01) |

(52) U.S. Cl.
CPC ....... *H01M 10/052* (2013.01); *H01M 2/1673* (2013.01); *H01M 2/1686* (2013.01); *H01M 10/0565* (2013.01); *H01M 10/0569* (2013.01); *H01M 4/382* (2013.01); *H01M 4/661* (2013.01); *H01M 2300/004* (2013.01)

(58) Field of Classification Search
CPC .......... H01M 10/052; H01M 10/0525; H01M 10/056; H01M 10/0565; H01M 10/0567; H01M 2/1673; H01M 4/382; Y02E 60/122

See application file for complete search history.

(56) References Cited

U.S. PATENT DOCUMENTS 8,741,479 B2 6/2014 Kang et al.
9,576,747 B2 * 2/2017 Yin .......................... H01M 6/04
(Continued)

FOREIGN PATENT DOCUMENTS

WO 2015143353 A1 9/2015

OTHER PUBLICATIONS

Zhiyong Liu, Graphene doping of P3HT:PCBM photovoltaic devices, 2010, Elsevier, Synthetic Metals 160, 1036-1039 (Year: 2010).*

(Continued)

*Primary Examiner* — Imran Akram
(74) *Attorney, Agent, or Firm* — Dinsmore & Shohl LLP (57) ABSTRACT

A rechargeable lithium battery includes a lithium anode, a cathode, and a separator interposed between the lithium anode and the cathode. The separator includes a porous polymer soaked with a liquid electrolyte. The lithium battery further includes an artificial solid electrolyte interphase membrane interposed between the lithium anode and the separator. The artificial solid electrolyte interphase membrane may be a composite of a carbonaceous material, a high shear modulus conducting polymer, and a conductive additive.

13 Claims, 6 Drawing Sheets

(56) References Cited

U.S. PATENT DOCUMENTS

| | | | |
|---|---|---|---|
| 2009/0176995 A1* | 7/2009 | Toru | B82Y 10/00 |
| | | | 549/58 |
| 2009/0176996 A1* | 7/2009 | Abdel-Magid | C07C 307/06 |
| | | | 549/58 |
| 2013/0092866 A1* | 4/2013 | Rupert | H01G 9/035 |
| | | | 252/62.2 |
| 2013/0344396 A1* | 12/2013 | Bosnyak | H01M 2/1653 |
| | | | 429/307 |
| 2014/0052322 A1* | 2/2014 | Takeshi | H01M 4/38 |
| | | | 701/22 |
| 2014/0072879 A1* | 3/2014 | Chen | H01M 4/366 |
| | | | 429/300 |
| 2014/0147602 A1 | 5/2014 | Rafailovich et al. | |
| 2014/0199585 A1* | 7/2014 | Rupert | H01G 11/62 |
| | | | 429/188 |
| 2015/0064538 A1* | 3/2015 | Bosnyak | H01M 2/1613 |
| | | | 429/144 |
| 2015/0144196 A1* | 5/2015 | Irwin | H01G 9/2027 |
| | | | 136/261 |
| 2015/0299852 A1* | 10/2015 | Ozkan | H01G 9/20 |
| | | | 136/255 |
| 2015/0337145 A1* | 11/2015 | Torrisi | C09D 11/037 |
| | | | 428/207 |

OTHER PUBLICATIONS

W. Xu, J. Wang, F. Ding, X. Chen, E.N. Nasybulin, Y. Zhang, J. Zhang; "Interconnected Hallow Carbon Nanospheres for Stable Lithium Metal Anodes"; Energy Environ. Sci., vol. 7, pp. 513-537, 2014.

G. Zheng, S.W. Lee, Z. Liang, H-W. Lee, K. Yan, H. Yao; "Lithium Metal Anodes for Rechargeable Batteries"; Nature Nanotechnology, DOI: 10.1038/NNANO.2014.152.

* cited by examiner

LITHIUM BATTERIES HAVING ARTIFICIAL SOLID ELECTROLYTE INTERPHASE MEMBRANE FOR ANODE PROTECTION

BACKGROUND

The present specification relates generally to lithium batteries and, more specifically, to lithium batteries including an artificial solid electrolyte interphase membrane to enhance cycle life and maximize usable energy density.

Lithium-ion batteries are widely used in devices such as smart phones, laptops, and vehicles. Lithium metal is an ideal anode material for rechargeable batteries because it has a high theoretical specific capacity (3860 mAh/g), a low density (0.59 g/cm$^3$), and a low negative electrochemical potential (−3.04 V vs. the standard hydrogen electrode). The use of a lithium metal-based battery has the potential for significantly higher energy density and power density over the use of other electrochemical batteries. Estimations suggest that a lithium battery based on a lithium metal anode can be up to ten times more energy dense than current lithium ion batteries.

However, a problem with the use of lithium metal anodes is the formation of microscopic fibers of lithium, called dendrites, over the course of several battery charge/discharge cycles. The formation and growth of dendrites on the anode during charge/discharge cycles cause low usable lithium energy or short-circuiting in a rechargeable battery system. Short-circuiting in particular can cause the battery to rapidly overheat or to start a fire.

Uncontrolled lithium dendrite growth and limited Coulombic efficiency (CE) during lithium deposition and depletion of a bulk lithium anode are the factors that lead to low cycle life. Furthermore, the rate of dendrite growth is amplified when the cell is cycled at high charge-discharge current density in a bulk lithium anode. Increasing anode surface area would reduce the effective charge/discharge current. Although low CE can be partially compensated for by using an excess amount of lithium to provide increased surface area at the expense of lower usable lithium energy, fire and other hazards associated with dendrite growth have limited the development of rechargeable lithium metal batteries. Accordingly, ongoing needs exist for technologies that both prevent dendrite growth and maximize the usable lithium energy in lithium batteries.

SUMMARY

Some embodiments of this specification are directed to lithium batteries that include a lithium anode, a cathode, a separator interposed between the lithium anode and the cathode, and an artificial solid electrolyte interphase membrane interposed between the lithium anode and the separator. In some embodiments, the separator may include a porous polymer, which may be soaked with a liquid electrolyte. The artificial solid electrolyte interphase membrane may include a composite of a carbonaceous material, a high shear modulus conducting polymer, and a conductive additive.

Further embodiments of this specification are directed to rechargeable lithium batteries that may include an anode-side current collector and a cathode-side current collector; a lithium anode, interposed between the cathode-side and anode-side current collector, the lithium anode being adjacent to the anode-side current collector; a cathode, interposed between the cathode-side and anode-side current collector, the cathode being adjacent to the cathode-side current collector; a separator interposed between the lithium anode and the cathode, and an artificial solid electrolyte interphase membrane interposed between the anode and the separator. In some embodiments, the separator may be soaked with a liquid electrolyte. The artificial solid electrolyte interphase membrane may include a composite of graphite, poly(3-hexylthiophene) (P3HT), and methanofullerene phenyl-$C_{61}$-butyric-acid-methyl-ester (PCBM). The composite of the artificial solid electrolyte interphase membrane may be a homogeneous composite having a semiconducting matrix.

Additional features and advantages of the embodiments described herein will be set forth in the detailed description which follows. Further additional features and advantages of the embodiments described herein should be readily apparent to those skilled in the art from the detailed description or should be recognized by practicing the embodiments described according to the detailed description which follows, including the appended drawings and the claims.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Some embodiments of this disclosure are directed to lithium batteries, such as rechargeable lithium batteries, including an artificial solid electrolyte interphase (ASEI) membrane that may protect a lithium metal anode from reaction with an electrolyte in the battery. The inclusion of the ASEI membrane may enhance battery cycle life, Coulombic efficiency (CE), and useable capacity of the lithium anode and the battery itself.

As used herein, the term "artificial" with regard to the solid electrolyte interphase membrane is distinguished from a "natural" solid electrolyte interphase that may form in a lithium battery from reaction products of anode and electrolytes during a charge/discharge cycle, for example. The artificial solid electrolyte interphase membranes included in lithium batteries according to embodiments herein are intentionally formed or deposited during fabrication or manufacture of the lithium batteries.

As used herein, the term "lithium battery" encompasses any electrochemical cell having an anode at which the half-cell reaction includes oxidation of lithium atoms to $Li^+$ ions with liberation of an electron during a discharge cycle. Thus, except where otherwise noted, the term "lithium battery" encompasses, without limitation, wet-cell batteries and solid-state batteries.

As used herein, and unless noted otherwise, the terms "anode" and "cathode" in descriptions of components of a battery shall refer to the function of such components during a discharge cycle of the battery, according to the plain and ordinary meaning of "anode" and "cathode." Thus, the term "anode" means "the electrode at which oxidation occurs during a discharge cycle," and the term "cathode" means "the electrode at which a reduction occurs during a discharge cycle." It should be understood that, for rechargeable batteries in particular, the anode of the discharge cycle functions as a cathode during a recharge cycle, and the cathode of the discharge cycle functions as an anode during a recharge cycle.

Figure 1:
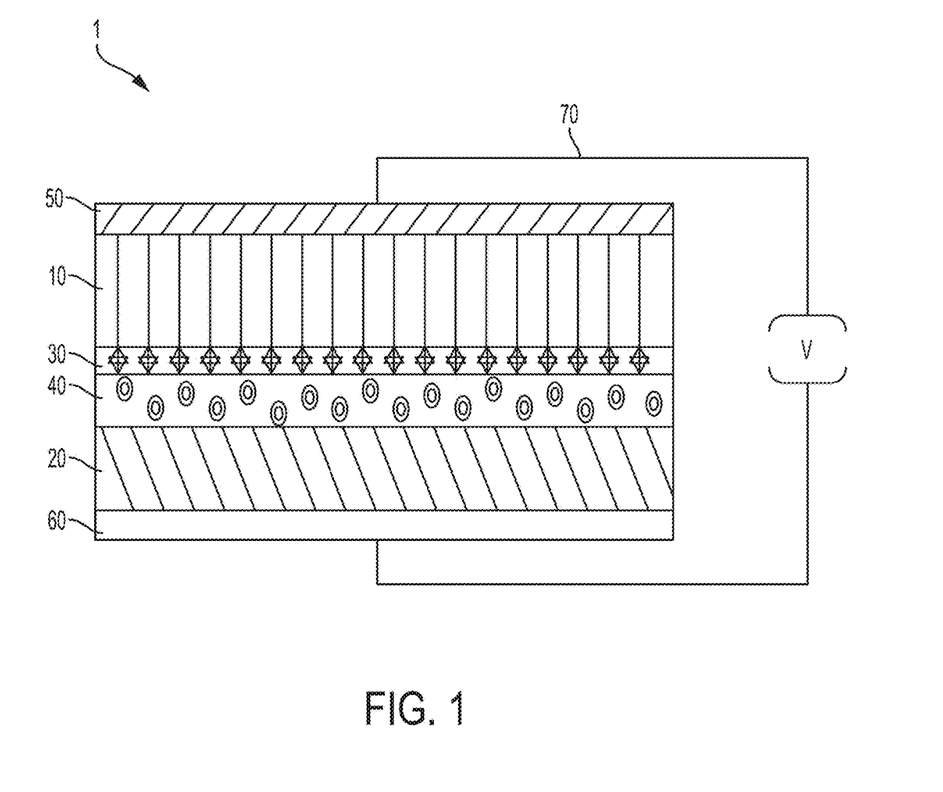
FIG. 1 is a schematic cross-sectional view of a lithium battery, configured as a layered battery cell and connected to an external circuit, according to one or more embodiments described herein.

Embodiments of lithium batteries, such as rechargeable lithium batteries, will now be described with reference to FIG. 1. According to some embodiments, a lithium battery may be configured as a layered battery cell 1 that includes as active layers a lithium anode 10, a cathode 20, a separator 40 interposed between the lithium anode 10 and the cathode 20, and an artificial solid electrolyte interphase membrane 30 interposed between the lithium anode 10 and the separator 40. The layered battery cell 1 of FIG. 1 is represented schematically in cross-section as a multilayer structure.

In addition to the active layers (lithium anode 10, cathode 20, separator 40, and artificial solid electrolyte interphase membrane 30), the layered battery cell 1 may include an anode current collector 50 and a cathode current collector 60 configured such that the active layers are interposed between the anode current collector 50 and the cathode current collector 60. In such configuration, the cathode current collector 60 is adjacent to the cathode 20, and the anode current collector 50 is adjacent to the lithium anode 10. Thus, the layered battery cell 1 may be electrically connected to an external circuit 70 through the anode current collector 50 and the cathode current collector 60. Examples of suitable materials for the anode current collector 50 include metals or metallic foils, copper, nickel, copper-nickel alloys, carbon paper, carbon nanotube paper, or graphene paper. Examples of suitable materials for the cathode current collector 60 include metals or metallic foils, aluminum, carbon paper, carbon nanotube paper, or graphene paper.

The lithium anode 10 of the layered battery cell 1 may comprise or consist of any anode material that contains lithium and is capable of generating lithium ions and electrons during operation of the layered battery cell 1, such as when the layered battery cell 1 is connected to an external circuit 70. In some embodiments, the lithium anode 10 may be a layer of elemental lithium. In other embodiments, the lithium anode 10 may be a layer of a lithium compound or a layer of doped lithium.

The cathode 20 of the layered battery cell 1 may comprise or consist of any cathode material having suitable properties to provide a working electrochemical cell in combination with the lithium anode 10 when the layered battery cell 1 is connected to an external circuit 70. Non-limiting examples of suitable cathodes for use as the cathode 20 of the layered battery cell 1 may include transition-metal oxides, such as lithium cobalt oxide ($LiCoO_2$), lithium manganese oxide ($LiMnO_4$), lithium nickel manganese cobalt oxide ($LiNi_xMn_yCo_zO_2$), and lithium nickel cobalt aluminum oxide ($LiNi_xCo_yAl_zO_2$); transition metal phosphates, such as lithium iron phosphate ($LiFePO_4$); carbonaceous materials; sulfur; lithium compounds, lithium sulfide; or phthalocyanine compounds such as iron phthalocyanine. The cathode 20 may also be an air cathode or an oxygen cathode or oxygen compounds such as lithium oxide ($LiO_2$) and lithium peroxide ($Li_2O_2$) cathodes. Air cathodes or oxygen cathodes may be made from an oxygen-permeable/adsorbing/reducible material that, in combination with suitable vent holes in an outer casing (not shown) for the layered battery cell 1, permits a reduction of oxygen molecules from the surroundings of the layered battery cell 1 to be the electrochemical half-cell in opposition to the oxidation of lithium during a discharge cycle. A reversible oxygen absorbing materials for use as the cathode 20 may include organic complexes of cobalt (Co) and iridium (Ir) such as [(bpbp)$Co_2(O_2)(O_2CR)$]($PF_6$) and [{(bpbp)$Co_2(O_2)$}$_2$(bdc$R_4$)]($PF_6$) (bpbp=2,6-bis (N,N-bis(2-pyridylmethyl) aminomethyl)-4-tert-butylphenolato, bdc=1,4-benzenedicarboxylato), cobalt tetrakis-tert-butyltetraazaporphyrin (CoTAP) or Co(CN)$_5$ inside zeolite. Oxygen reduction materials may include Pt, Pd, $MnO_2$, ceramics, etc.

The separator 40 may be any kind of separator material suitable for use in lithium batteries to prevent direct contact of the lithium anode 10 with the cathode 20 while permitting ion mobility between the lithium anode 10 and cathode 20. The separator 40 may be a solid material or a solid material in combination with a liquid electrolyte. For example, the separator 40 may comprise or consist of a porous polymer soaked with a liquid electrolyte. An example of a suitable porous polymer for use as the separator 40 is polypropylene. In some embodiments, the polypropylene may have a porosity of from about 35% to about 45%, such as about 40%, for example. The porous polymer may be soaked with a liquid electrolyte. The liquid electrolyte may be any electrolyte fluid that is compatible with the porous polymer and that facilitates ion or electron flow through the porous polymer. Examples of electrolyte fluids suitable for use as the liquid electrolyte include, without limitation, lithium hexafluorophosphate ($LiPF_6$), lithium tetraborate ($LiBF_4$), lithium triflate ($CF_3SO_3Li$), lithium hexafluoroarsenate ($LiAsF_6$), ethylene carbonate, dimethyl carbonate, ethylmethyl carbonate, and mixtures thereof. The liquid electrolyte may be a flowable liquid or a gel. A porous polymer that is soaked with a liquid electrolyte need not necessarily be completely saturated with the liquid electrolyte to the maximum amount of liquid electrolyte that can be held within the porous polymer. Rather, the liquid electrolyte may be present in any amount sufficient to facilitate the flow of ions or electrons through the porous polymer of the separator 40.

The artificial solid electrolyte interphase membrane 30 may comprise or consist of a composite that includes a carbonaceous material, a high shear-modulus conducting polymer, and a conductive additive. The artificial solid electrolyte interphase membrane 30 is configured to inhibit or prevent dendrite formation from the lithium anode 10. Thus, in some embodiments, the artificial solid electrolyte interphase membrane 30 may be in direct physical contact with the lithium anode 10. For example, the artificial solid electrolyte interphase membrane 30 may be coated onto the lithium anode 10, or the lithium anode 10 may be coated directly onto the artificial solid electrolyte interphase membrane 30. The artificial solid electrolyte interphase membrane 30 may be interposed between the lithium anode 10 and the separator 40.

Figure 3A:
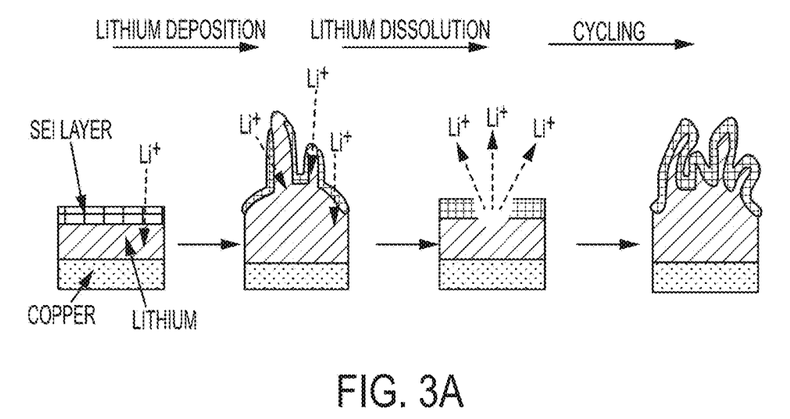
FIG. 3A is a schematic diagram of the life cycle of a lithium anode without an artificial solid electrolyte interphase membrane, for which dendrite formation results from a cycle of lithium-ion deposition and lithium-ion depletion.
Figure 3B:
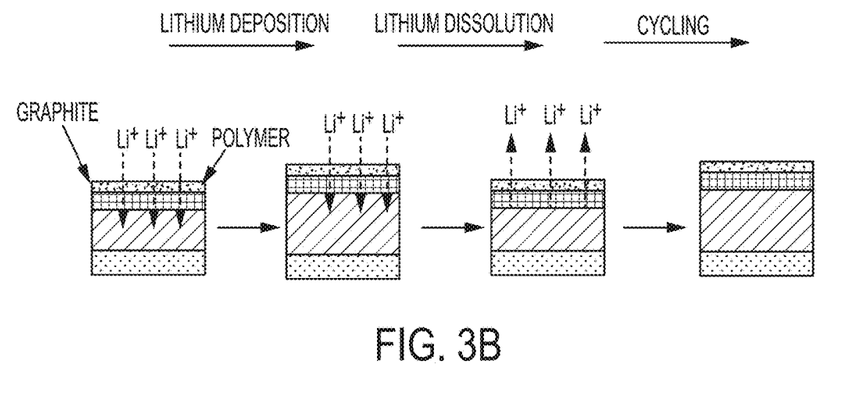
FIG. 3B is a schematic diagram of the life cycle of a lithium anode with an artificial solid electrolyte interphase membrane according to embodiments herein.

Illustrations of the function of the artificial solid electrolyte interphase membrane 30 are provided in FIGS. 3A and 3B. Referring first to FIG. 3A, without intent to be bound by theory, it is believed that when the artificial solid electrolyte interphase membrane 30 according to embodiments herein is not present in the layered battery cell 1, a natural solid electrolyte interphase ("SEI layer") would form by chemical reactions between the lithium anode 10 and electrolytes present in the layered battery cell 1 during the operation of the layered battery cell 1. The natural solid electrolyte interphase is believed to be generally unable to withstand mechanical deformations from growing dendrites and, therefore, continuously breaks and repairs during cycling. As a result, lithium ions would be depleted rapidly from the lithium anode 10 and then be deposited back into the lithium anode 10 to cause the natural solid electrolyte interphase to break down. Once the natural solid electrolyte interphase breaks down, lithium dendrites form, and upon each cycle, more dendrite growth occurs.

In contrast, and referring to the illustrations of FIG. 3B, the artificial solid electrolyte interphase membrane 30 of the layered battery cell 1 according to embodiments herein may be formed from materials that mimic the general function of a natural solid electrolyte interphase but that, in contrast to the natural solid electrolyte interphase, are mechanically durable and able to reduce irreversible battery capacity loss. As shown in FIG. 3B, the artificial solid electrolyte interphase membrane that includes graphite and polymer remains intact during lithium deposition, lithium dissolution, and repeated cycling through discharge cycles and recharge cycles. Thus, when the artificial solid electrolyte interphase membrane remains intact, it serves to minimize or prevent dendrite formation, to protect from the lithium anode from moisture, and to provide mechanical vibration/shock resistance. All of these features of the artificial solid electrolyte interphase membrane according to embodiments herein reduce cell shorting, thereby enhancing cell life and safety.

According to some embodiments, the artificial solid electrolyte interphase membrane 30 may be a homogeneous composite of the carbonaceous material, the high shear-modulus conducting polymer, and the conductive additive. The artificial solid electrolyte interphase membrane 30 may be conductive or semiconductive. The three materials that compose the artificial solid electrolyte interphase membrane 30 may be selected to provide various functions that work together to realize the benefits of the artificial solid electrolyte interphase membrane 30. For example, the carbonaceous material of the artificial solid electrolyte interphase membrane 30 may provide self-regulating lithium ion transporting channels that facilitate uniform desorption and deposition of lithium ions from the lithium anode 10. The high shear-modulus conducting polymer may mechanically suppress lithium dendrite growth, maintain the electric conductivity of the artificial solid electrolyte interphase membrane 30, and separate the lithium anode 10 from direct contact with electrolytes in the layered battery cell 1. The conductive additive may serve as an efficient electron conductor by itself or as a species that increases the conductivity of the high shear-modulus conducting polymer in combination with the carbonaceous material. Thereby, it is believed that the three components of the artificial solid electrolyte interphase membrane 30 create a synergistic matrix that increases the life cycle of the layered battery cell 1.

In illustrative, non-limiting embodiments, the carbonaceous material of the artificial solid electrolyte interphase membrane 30, which may provide self-regulating lithium ion transporting channels, may be chosen from materials such as graphite, carbon black, carbon nanotubes, or graphene. The carbonaceous material may have any grain size suitable to provide the self-regulating lithium-ion transporting channels. For example, the carbonaceous material may have grain sizes such as from about 45 μm to about 70 μm. The grain size of graphite may be tailored to modulate the electrical properties of the artificial solid electrolyte interphase membrane 30 according to a desired implementation of the layered battery cell 1. Likewise, the properties of the artificial solid electrolyte interphase membrane 30 may be tailored by choosing a thickness of the artificial solid electrolyte interphase membrane 30 based on a desired effect.

According to some embodiments, the high shear-modulus conducting polymer may have a shear modulus of at least $10^8$ Pa, such as greater than $10^9$ Pa, for example. Without intent to be bound by theory, it is believed that when a polymer exhibits a strong crystallinity that imparts mechanical resilience without inducing brittleness and stiffness, a lower flexural strength may result. Accordingly, the high shear-modulus conducting polymer may be selected to have a high tensile modulus, such as from about 150 MPa to about 350 MPa.

In some embodiments, the high shear-modulus conducting polymer may be chosen from materials such as poly(3-hexylthiophene); polythiophenes generally; polyanilines; polypyrroles; polyacetylenes; poly[2-methoxy-5-(3',7'-dimethyloctyloxy)-1,4-phenylenevinylene; MDMO-PPV]; poly[2-methoxy-5-(2-ethylhexyloxy)-1,4-phenylenevinylene; MEH-PPV]; or any combination of these. In further embodiments, the high shear-modulus conducting polymer may be biocompatible biopolymers based on DNA or nucleic acids, such as guanine, cytosine, thymine, and adenine. Without intent to be bound by theory, it is believed that, owing to the presence of lone pair electrons (−ve) on nitrogen atoms of the DNA or nucleic acids, a stable complex may be formed with lithium ions (+ve). In illustrative embodiments, the high shear-modulus conducting polymer may be poly(3-hexylthiophene) (P3HT). An example P3HT with 98% head-to-tail coupling may have a tensile modulus of 287 MPa. The overall effect of the high shear-modulus conducting polymer is believed to include increases the mechanical, electrical, and separation support of the homogenous composite that makes up the artificial solid electrolyte interphase membrane 30.

The conductive additive of the artificial solid electrolyte interphase membrane 30 may be any efficient electron conductor added in an amount that helps maintain the conductivity of the composite. In illustrative, non-limiting embodiments, the conductive additive may be chosen from methanofullerene phenyl-$C_{61}$-butyric-acid-methyl-ester, carbon nanotubes, graphene, or a combination thereof. Some of these materials conductive property are enhanced with the addition of a chemical dopant. The chemical dopant may be a metal chloride, such as iron (III) chloride, for example.

In illustrative embodiments, the artificial solid electrolyte interphase membrane 30 may be prepared by combining the carbonaceous material, the high shear modulus conducting polymer, and the conductive additive to form a mixture. The mixture may be homogenized by mixing, for example. The homogenized mixture may be applied to an existing lithium anode and dried. Alternatively, the homogenized mixture may be applied to any substrate and dried, after which drying a lithium anode may be applied to the artificial solid electrolyte interphase membrane.

The combination of the carbonaceous material, the high shear-modulus conducting polymer, and the conductive additive of the artificial solid electrolyte interphase membrane 30 creates a synergistic effect, yielding a mechanically strong, yet flexible, conductive material that enables lithium ions to channel through the artificial solid electrolyte interphase membrane 30. Without intent to be bound by theory, it is believed that the overall effect, when the homogeneous composite is applied to a rechargeable metal anode, is an increase in the Coulombic Efficiency and, thus, an increase in the life cycle of the battery. In one embodiment, the rechargeable lithium battery may have a Coulombic Efficiency of greater than or equal to 99%.

The lithium batteries according to illustrative embodiments may have lifetimes of from 220 cycles to 350 cycles, or more, when the lithium battery is cycled galvanostatically for a fixed capacity of 1 mAh/$cm^2$ and a fixed current density of 1.3 mA/$cm^2$.

A method for preparing the layered battery cells as previously described a rechargeable battery with an artificial solid electrolyte interphase membrane 30 may include dissolving a high shear-modulus conducting polymer and an electron conducting material, and then adding the resulting polymer blend to a carbonaceous material to form a mixture. The mixture may be applied to a metal anode. The artificial solid electrolyte interphase membrane 30 may be dried for a period of time before the artificial solid electrolyte interphase membrane 30 is coated with a separator 40. Once the separator 40 is soaked with the electrolyte, an anode current collector 50 and a cathode current collector 60 may be added.

It should be understood that the layered battery cell 1 may have a variety of shapes and sizes and that any relative thicknesses between or among layers of the layered battery cell 1 of FIG. 1 are intended to be illustrative only, not limiting. It should also be understood that the layered battery cell 1 may include additional layers not shown in FIG. 1 between the layers that are shown in FIG. 1, provided such additional layers do not interfere with the ability of the artificial solid electrolyte interphase membrane 30 to prevent formation of dendrites at the lithium anode 10. Thus, the term "interposed between" with regard to a particular layer is intended to provide only a spatial relationship of the particular layer with two other layers, not to suggest that the particular layer necessarily is in direct physical contact with the two layers between which it is interposed.

The artificial solid electrolyte interphase membrane 30 as described previously with respect to lithium batteries additionally may be implemented in batteries having rechargeable metal anodes other than lithium. Thus, further embodiments may be directed to a rechargeable battery having the components of the layered battery cell 1 of FIG. 1, except that the lithium anode 10 is replaced with a rechargeable anode of a material other than lithium. Illustrative materials for such a rechargeable anode may include sodium, aluminum, or magnesium, for example.

EXAMPLES

Certain embodiments described in the foregoing Detailed Description will be further clarified by the following Examples. It should be understood that the following examples are not intended to limit the scope of the embodiments described in the Detailed Description or recited in the claims.

Example 1

Preparation of Artificial Solid Electrolyte Interphase Membrane

Figure 2A:
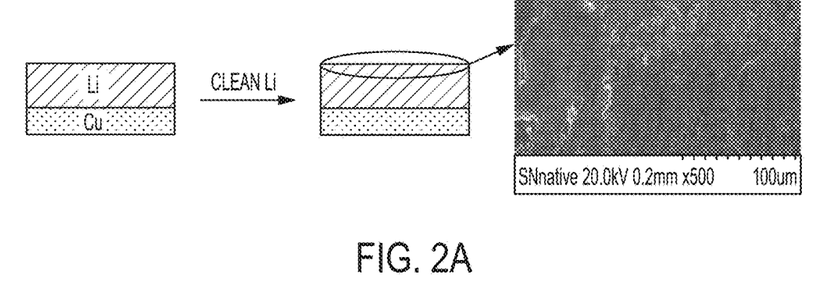
FIG. 2A is an electron micrograph of a lithium anode without an artificial solid electrolyte interphase membrane.
Figure 2B:
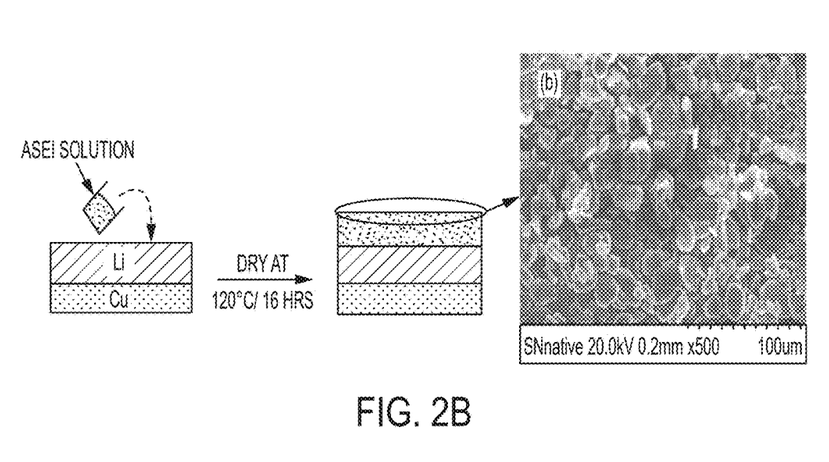
FIG. 2B is an electron micrograph of a lithium anode with an artificial solid electrolyte interphase membrane.

A layer of lithium was deposited onto a copper foil as illustrated in FIG. 2A. The layer of lithium had a generally smooth surface, as evidenced in the scanning electron micrograph of FIG. 2A. An artificial solid electrolyte interphase membrane was applied over the layer of lithium as illustrated in FIG. 2B. Specifically, the artificial solid electrolyte interphase membrane was made by dissolving 5 mg of methanofullerene phenyl-$C_{61}$-butyric-acid-methyl-ester (PCBM) and 5 mg of poly(3-hexylthiophene) (P3HT) (specifically, a regioregular P3HT having 98% head-to-tail coupling) in 1 g of dichlorobenzene to make a stock solution. Then, about 400 μL of the stock solution were added to 4 mg of graphite to form a mixture. The mixture was centrifuged to make a homogeneous solution. Approximately 400 μL of the ASEI solution was drop casted onto a clean rolled lithium and was dried at room temperature (25° C.±5° C.) inside an ultra-pure argon-filled dry box and was finally dried at 120° C. for 1 hour before use. The resultant artificial solid electrolyte interphase membrane had a granular surface structure, as evidenced in the scanning electron micrograph of FIG. 2B.

Example 2

Preparation of Layered Battery Cell

Layered lithium battery cells with thicknesses of approximately 10 μm and diameters of approximately 16 mm were prepared with a copper foil as a current collector at the lithium anode. The lithium anode, cleaned and rolled lithium foil, was placed on top the copper foil.

As a basis for comparison, a first battery cell (cell 1) was prepared without an artificial solid electrolyte interphase membrane using a bare lithium cell. A second battery cell (cell 2) was prepared with an artificial solid electrolyte interphase membrane prepared according to Example 1. Both cell 1 and cell 2 had a 2032 coin-cell configuration and included lithium metal as an anode. In both cell 1 and cell 2, identical amounts of lithium metal anode, standard cathode ($LiCoO_2$), separator (polypropylene, PP), and liquid electrolyte (a solution of lithium hexafluoro arsenate ($LiAsF_6$) in a solvent mixture of ethylene carbonate, dimethyl carbonate, ethylmethyl carbonate in 1:1:1 weight ratio)) were used.

Example 3

Measurements of Cycling Behavior

Cell 1 and cell 2 from Example 2 were tested using identical cycling test protocols, by which a first five cycles were carried out at a C/10 rate (0.25 mA/cm$^2$) and additional cycles were carried out at a C/2 rate (fixed current density of 1.3 mA/cm$^2$) to provide a constant charge-discharge capacity of 1 mAh/cm$^2$ at room temperature. Both the cells were reopened after cycling. It was found that after the cycling, cell 2 with the artificial solid electrolyte interphase membrane protected lithium still had a surplus of lithium. However, cell 1 without the artificial solid electrolyte interphase membrane had no available lithium.

Using the surplus of lithium from cell 2, an additional cell, cell 3, was made. Cell 3 included an artificial solid electrolyte interphase membrane prepared according to Example 1. Cell 3 was then cycled to determine its usable lithium energy.

From the measurements of cell 1, cell 2, and cell 3, it was determined that for a fixed lithium amount and other identical cell components, 70 cycles could be achieved using bare Li (comparative cell 1) before Coulombic efficiency dropped off; 220 cycles could be achieved for lithium protected by an artificial solid electrolyte interphase membrane (cell 2) before Coulombic efficiency dropped off. This represented a greater than 200% increase in number of available cycles for the cell 2 over cell 1. Furthermore, 70 additional cycles could be achieved from the lithium recovered from cell 2 and placed into cell 3 before Coulombic efficiency dropped off. Thus, from the original lithium incorporated into cell 2, recovered after testing, and subsequently incorporated into cell 3, a total of 220+70=290 cycles were achieved from cells with lithium protected by an artificial solid electrolyte interphase membrane prepared according to Example 1. This represented a greater than 300% increase in the amount of usable lithium energy for the cell 2 over cell 1.

Figure 5:
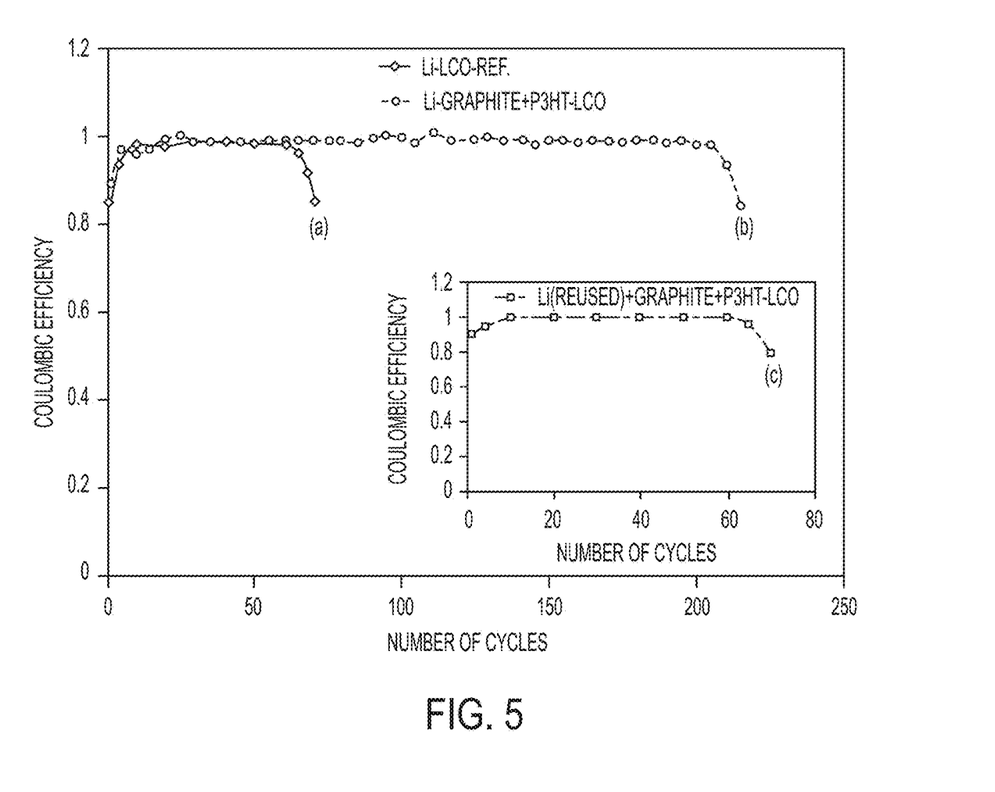
FIG. 5 is a graph of Coulombic Efficiency of three battery cells: a pristine lithium anode without an artificial solid electrolyte interphase membrane, a lithium anode with the artificial solid electrolyte interphase membrane, and a lithium anode with an artificial solid electrolyte interphase membrane made from reused lithium.

Data from measurements of Coulombic efficiency of (a) cell 1, (b) cell 2, and (c) cell 3 during the cycling tests are provided in FIG. 5. During initial cycling, the Coulombic efficiency (CE) of cell 2 and cell 3 was close to 99%, whereas the CE of cell 1 was close to 98%. Even though the CE efficiency of all cells was very similar initially, cell 1 failed early. It is believed that cell 1 failed early as a result of rapid dendrite growth. The rapid dendrite growth, in turn, resulted in low usable lithium energy, brought about by an irreversible reaction between the unprotected lithium and the liquid electrolyte.

To further explore the effect of the artificial solid electrolyte interphase membrane in the presence of additional operational factors, two additional cells, cell 4 and cell 5, were prepared identical to cell 1 and cell 2, respectively. That is, cell 4 had no artificial solid electrolyte interphase membrane, and cell 5 included an artificial solid electrolyte interphase membrane. Cell 4 and cell 5 then were subjected to similar cycling tests as those to which cell 1 and cell 2 were subjected, except that the cycling was conducted over a range of current densities. In particular, cell 4 and cell 5 were cycled galvanostatically at a greater constant charge-discharge capacity (2.25 mAh/cm$^2$ at room temperature instead of 1 mAh/cm$^2$ at room temperature) and a variable current density (in a range of 0.26 mA/cm$^2$ to 1.3 mA/cm$^2$ instead of at a fixed 1.3 mA/cm$^2$). It is believed that testing of cycling at variable current density reveals information on rate capability and capacity per unit area, so as to provide details relevant to developing batteries with specifications suitable for a wide variety of low-to-high energy or power output.

Figure 6:
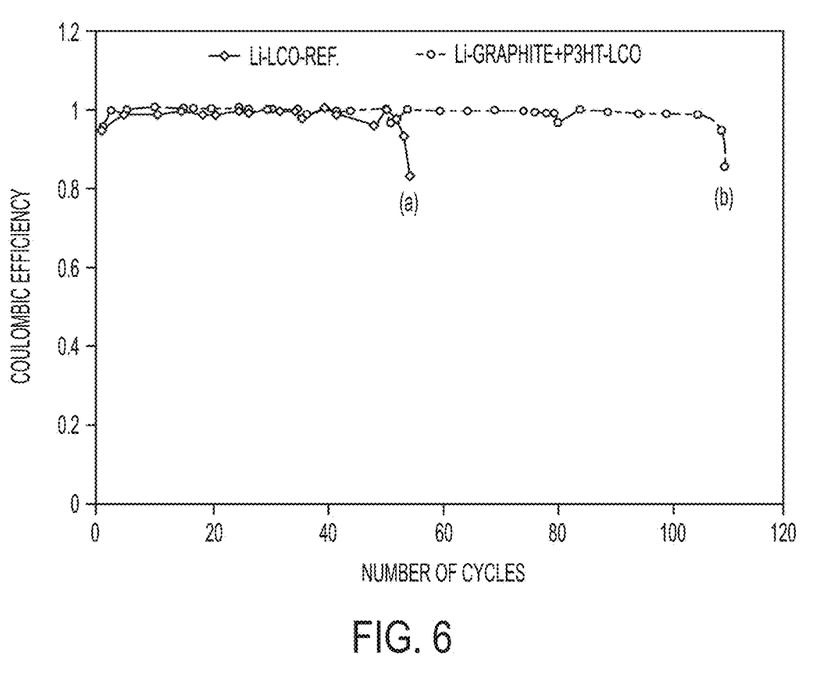
FIG. 6 is a graph of the Coulombic Efficiency of two different battery cells: a pristine lithium anode without an ASEI membrane, a lithium anode with the ASEI—both cells were cycled Galvanostatically for a fixed capacity (2.25 mAh/cm$^2$) and variable current density (0.26 mA/cm$^2$ to 1.3 mA/cm$^2$).

The variable current density cycling data for (a) cell 4 and (b) cell 5 are provided in FIG. 6. Consistent with the results from fixed current-density cycling tests as compiled in FIG. 5, cell 4 without an artificial solid electrolyte interphase membrane could be cycled only 55 times before Coulombic efficiency dropped off, whereas cell 5 with an artificial solid electrolyte interphase membrane could be cycled 115 times before Coulombic efficiency dropped off. Thus, the cell with the artificial solid electrolyte interphase membrane led to a 109% improvement in number of cycles over the cell without the membrane under conditions of greater constant charge-discharge capacity and variable current density.

Thus, the data compiled in FIGS. 5 and 6 show that the artificial solid electrolyte interphase membrane plays a vital role in improving lithium cycle life and lithium useable energy. It should be understood that, even though the data of FIGS. 5 and 6 were obtained for only one composition of graphite, P3HT, and PCBM in the artificial solid electrolyte interphase membrane, different percentages of these materials, or different conductive polymers, electrolytes, and cathodes, may be implemented in similar battery cells with expectation of similar observations of improvement.

Example 4

Measurements of Impedance Evolution

Impedance evolution during cell storage is crucial for battery shelf life. Room-temperature and time-dependent evolution of impedances in Li/Li symmetrical cells with an artificial solid electrolyte interphase membrane (triangle data points) and without an artificial solid electrolyte interphase membrane (square data points) are presented in FIG. 4. The battery cells tested for impedance evolution included lithium anodes and non-aqueous liquid electrolyte (1 M LiAsF$_6$ in EC:DMC:EMC (1:1:1)).

Figure 4:
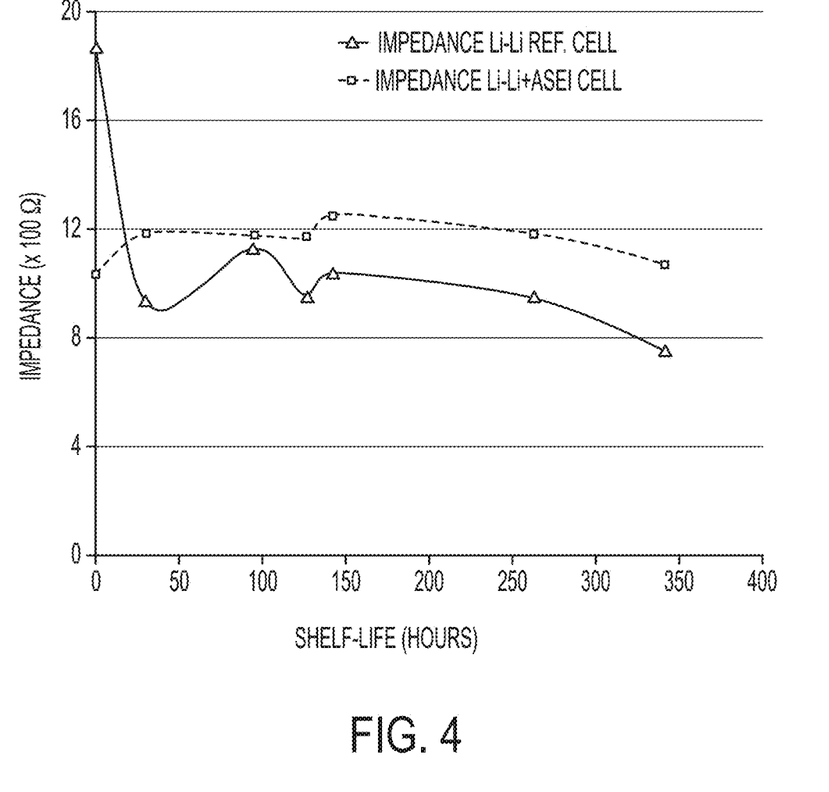
FIG. 4 is a graph comparing impedance evolution during cell storage of an unprotected lithium anode battery with the impedance evolution during cell storage of a lithium anode battery protected with an artificial solid electrolyte interphase membrane according to embodiments herein.

The cell without an artificial solid electrolyte interphase membrane showed a wide variation in impedance during a storage period (maximum of 1900Ω to minimum of 900Ω over the course of 350 h), whereas impedance variation was negligible during same period for the cell with the artificial solid electrolyte interphase membrane (maximum of 1000Ω to minimum of 900Ω over the course of 350 h). The pronounced stability in impedance may be attributed to the artificial solid electrolyte interphase membrane functioning to shield lithium from the liquid electrolyte during discharge. Namely, when lithium is in direct contact with liquid electrolyte, the lithium is free to react with the liquid electrolyte and form a natural solid electrolyte interphase. In contrast with an artificial solid electrolyte interphase membrane, and as explained previously, the natural solid electrolyte interphase is prone to cause impedance changes over cycling because it is mechanically less stable than the artificial solid electrolyte interphase membrane prepared according to embodiments of this disclosure.

It should be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

Unless otherwise defined, all technical and scientific terms used have the same meaning as commonly understood by one of ordinary skill in the art to which the claimed subject matter belongs. The terminology used in this description is for describing particular embodiments only and is not intended to be limiting. As used in the specification and appended claims, the singular forms "a," "an," and "the" are intended to include the plural forms as well, unless the context clearly indicates otherwise.

It is noted that the terms "substantially" and "about" may be used to represent the inherent degree of uncertainty that may be attributed to any quantitative comparison, value, measurement, or other representation. These terms are also used to represent the degree by which a quantitative representation may vary from a stated reference without resulting in a change in basic function of the subject matter at issue.

What is claimed is:

1. A lithium battery comprising:
a lithium anode;
a cathode;
a separator interposed between the lithium anode and the cathode; and
an artificial solid electrolyte interphase membrane interposed between the lithium anode and the separator, wherein the artificial solid electrolyte interphase membrane is a homogeneous semiconducting composite of graphite, poly(3-hexylthiophene), and methanofullerene phenyl-$C_{61}$-butyric-acid-methyl-ester.

2. The lithium battery of claim 1, wherein the poly(3-hexylthiophene) has a shear modulus of at least $10^8$ Pa.

3. The lithium battery of claim 1, wherein the cathode comprises lithium cobalt oxide, lithium oxide, lithium sulfide, or iron phthalocyanine.

4. The lithium battery of claim 1, wherein the separator is a porous polymer soaked with a liquid electrolyte.

5. The lithium battery of claim 4, wherein:
the porous polymer comprises polypropylene; and
the liquid electrolyte comprises a mixture of lithium hexafluoroarsenate, ethylene carbonate, dimethyl carbonate, and ethylmethyl carbonate.

6. The lithium battery of claim 1, wherein the lithium battery has a Coulombic Efficiency of 99%.

7. The lithium battery of claim 1, wherein the artificial solid electrolyte interphase membrane consists of the homogeneous semiconducting composite.

8. The lithium battery of claim 1, wherein the artificial solid electrolyte interphase membrane is prepared by:
combining the graphite, the poly(3-hexylthiophene), and the methanofullerene phenyl-$C_{61}$-butyric-acid-methyl-ester to form a mixture;
homogenizing the mixture;
applying the mixture onto the lithium anode; and
drying the mixture to form the artificial solid electrolyte interphase membrane.

9. The lithium battery of claim 8, wherein the poly(3-hexylthiophene) has a shear modulus of at least $10^8$ Pa.

10. The lithium battery of claim 8, wherein the artificial solid electrolyte interphase membrane is a homogenous semiconducting matrix.

11. A rechargeable lithium battery comprising:
an anode current collector;
a cathode current collector;
a lithium anode adjacent to the anode-side current collector and interposed between the cathode current collector and the anode current collector;
a cathode adjacent to the cathode-side current collector and interposed between the cathode current collector and the anode current collector;
a separator interposed between the lithium anode and the cathode; and
an artificial solid electrolyte interphase membrane interposed between the anode and the separator, wherein the artificial solid electrolyte interphase membrane is a homogeneous semiconducting composite of graphite, poly(3-hexylthiophene), and methanofullerene phenyl-$C_{61}$-butyric-acid-methyl-ester.

12. The rechargeable lithium battery of claim 11, wherein:
the anode current collector is copper;
the cathode current collector is aluminum;
the lithium anode is metallic lithium;
the cathode comprises lithium cobalt oxide;
the separator is a porous polymer soaked with a liquid electrolyte;
the porous polymer comprises polypropylene; and
the liquid electrolyte comprises a mixture of lithium hexafluoroarsenate, ethylene carbonate, dimethylene carbonate, and ethylmethyl carbonate.

13. The rechargeable lithium battery of claim 11, wherein the artificial solid electrolyte interphase membrane consists of the homogeneous semiconducting composite.

\* \* \* \* \*